United States Patent [19]
Knowles

[11] 3,764,682
[45] Oct. 9, 1973

[54] IRRITANT COMPOSITION COMPRISING 2-(4 SUBSTITUTED CYCLOHEXYLAMINO)-2-OXAZOLINES

[75] Inventor: Richard N. Knowles, Hockessin, Del.

[73] Assignee: E. I. du Pont de Nemours and Company, Wilmington, Del.

[22] Filed: Oct. 24, 1968

[21] Appl. No.: 770,452

Related U.S. Application Data

[60] Division of Ser. No. 635,303, April 20, 1967, which is a continuation-in-part of Ser. No. 574,496, Aug. 18, 1966.

[52] U.S. Cl.............................. 424/272, 260/307 F
[51] Int. Cl............................................ A01n 9/22
[58] Field of Search........................ 424/325, 272; 260/307

[56] References Cited
UNITED STATES PATENTS
3,274,230  9/1966  Braun ................................ 424/267
3,109,845  11/1963  Seeger et al. ...................... 424/325

Primary Examiner—Leland A. Sebastian
Attorney—Herbert W. Larson

[57] ABSTRACT

Repelling animals with 2-(4-substituted cyclohexylamino)-2-oxazolines of the formula:

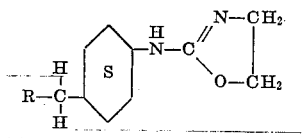

wherein
R is alkyl, cycloalkyl, cycloalkylalkyl, bicycloalkyl or tricycloalkyl.

Typical is 2-(cis-4-cyclohexylmethylcyclohexylamino)-2- oxazoline, useful as an animal repellant.

9 Claims, No Drawings

IRRITANT COMPOSITION COMPRISING 2-(4 SUBSTITUTED CYCLOHEXYLAMINO)-2-OXAZOLINES

CROSS REFERENCE

This application is a divisional application of my co-pending application Ser. No. 635,303, filed Apr. 20, 1967 which in turn is a continuation-in-part of my application Ser. No. 574,496, filed Aug. 18, 1966.

BACKGROUND OF THE INVENTION

United States patent application Ser. No. 532,544, filed Mar. 1, 1966, now abandoned discloses compounds containing a cyclohexyl ring structure having utility as animal repellants.

I have now discovered another class of compounds containing a cyclohexyl ring structure which also has utility as animal repellants.

SUMMARY OF THE INVENTION

This invention relates to substituted oxazolines.

More specifically, this invention refers to 2-(4-substituted cyclohexylamino)-2-oxazolines, compositions containing them and methods of applying them to repel animals.

Patent animal inhalation irritant effects are achieved by applying to animals or their habitat, compounds of the formula:

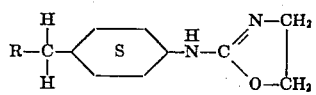

wherein
R is alkyl of three through eight carbon atoms, cycloalkyl of four through nine carbon atoms, cycloalkylalkyl of five through 10 carbon atoms, bicycloalkyl of seven through 10 carbon atoms, or tricycloalkyl of 10 through 11 carbon atoms.

Substitutions on the cyclohexyl ring must be in the cis configuration to obtain optimum irritant effects.

Most preferred because of high irritant activity at low use rate is 2-(cis-4-cyclohexylmethylcyclohexylamino)-2-oxazoline.

Utility

Compounds of this invention cause potent irritation to animal tissue, particularly to the mucous membranes.

Animals exposed to the above compounds show signs of severe respiratory irritation and are quickly incapacitated. These compounds have two advantages over currently used riot control agents such as 2-chloroacetophenone (CN), and animal repellants such as allylisocyanate for dogs and bone tar oil for deer. One, the compounds are more potent at low concentrations and two, provide residual activity over longer periods of time.

Compounds of this invention and particularly 2-(cis-4-cyclohexylmethylcyclohexylamino)2-oxazoline have potential use as riot control agents, dog repellants, deer repellants, rodent repellants and for contaminating caves or underground tunnels.

PREPARATION

The compounds of this invention can be prepared by the following synthetic route.

R in the following reactions is as defined above in formula (1).

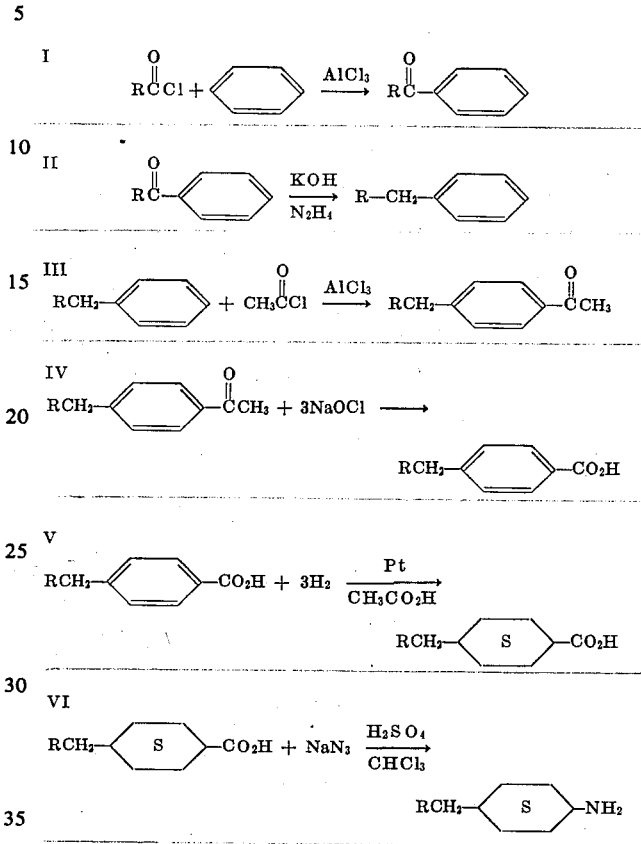

An alternate synthesis of the amine intermediates can be used when the appropriately substituted aniline derivatives are available. This route is illustrated below.

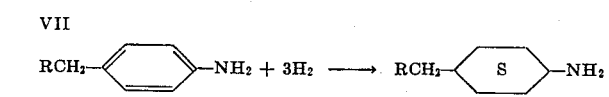

The 2-amino-2-oxazolines of this invention are prepared according to the following reactions:

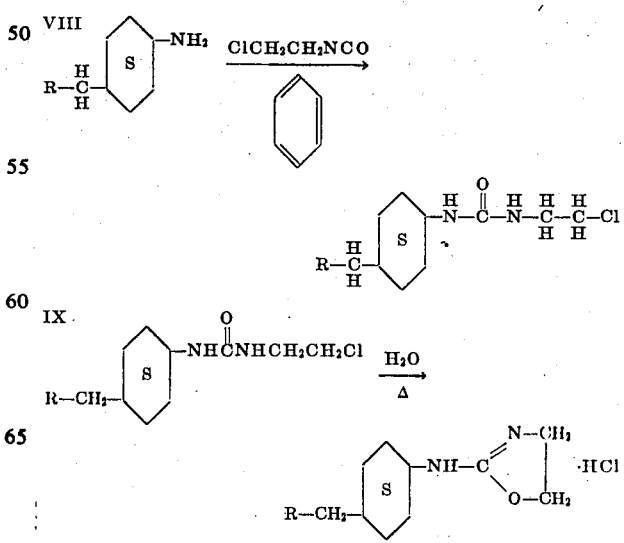

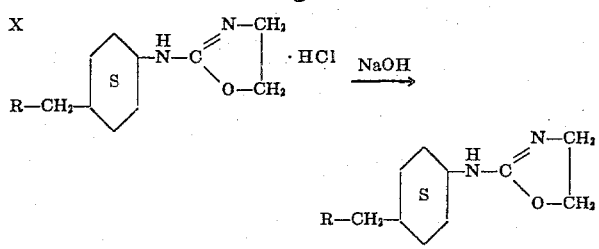

The Friedel-Crafts reaction (I) is run by carefully adding the acid chloride to a stirring mixture of aluminum chloride and benzene. A slight molar excess of catalyst is used; benzene serves as both a solvent and reactant. The acid chloride is added at a rate sufficient to keep the temperature of the slurry at about 30°–40°C. The mixture is stirred for one additional hour after all of the acid chloride is added, and then water is slowly added to decompose the catalyst. Sufficient water is added so that all the solids are dissolved. The phenylalkyl ketone is isolated from the benzene solution and is purified by distillation.

The Wolff-Kishner reduction (II) is run in 2-(2-ethoxyethoxy)ethanol using a modification of the procedure given by J. Cason, et al. in *Organic Synthesis*, Collective Vol. IV, John Wiley and Sons, New York, (1963), p. 510. Once the reactants are mixed, they are heated to reflux for a period of three to five hours. The reflux temperature is generally in the 130°–140°C. range. AFter completion of the reflux period, the solution is cooled and poured into three to four volumes of water. The alkylbenzene product is extracted with pentane and purified by distillation.

The Friedel-Crafts reaction (III) is run by mixing approximately equimolar quantities of the reactants together in hexane at less than 5°C. The stirring mixture is slowly allowed to warm to room temperature, and when hydrogen chloride evolution subsides, the mixture is refluxed several hours. Water is then added slowly to decompose the catalyst. A sufficient quantity of water is then added so that all of the solids are dissolved. The desired acetophenone derivative is isolated from the organic phase, and purified by distillation. Gas-liquid chromatography on an F & M Model 500 Gas Chromatographer using a 2 feet × ¼ inch O.D. stainless steel column, containing 10 percent Carbowax 20M on 60–80 mesh Diatoport T indicates that about 98 percent of the acetophenone is the 1,4 isomer and 2 percent is the 1,2 isomer. The 1,2 isomer has the shorter retention time.

The haloform reaction (IV) is run by slowly adding a cold (<5°C.) sodium hypochlorite solution to a stirring solution of the acetophenone derivative in methanol. This is a modification of the procedure used by E. E. Royals (J. Am. Chem. Soc., 69, 841 (1947) for the haloform reaction of α-ionone. After the sodium hypochlorite solution is added, the mixture is warmed to room temperature, and left standing over night. Thereafter, the mixture is heated to reflux, and the distillate collected until the pot temperature rises to 95°–97°C.; most of the methanol is distilled. The pot is then cooled to room temperature. In those reactions where R is a low molecular weight radical such as butyl, the sodium benzoate derivative remains dissolved; however, when R is a high molecular weight radical such as octyl, the sodium benzoate derivative precipitates as a soapy solid. Sulfur dioxide is bubbled into the alkaline pot concentrate until the pH drops below 3. The precipitated benzoic acid derivative is either filtered and washed with water, or extracted with methylene chloride depending on whether or not the benzoic acid is easily filterable or is of a soapy nature. Some of these benzoic acid derivatives can be recrystallized from acetonitrile or pentane, and some are purified merely by trituration with cold pentane.

The catalytic hydrogenation (V) is performed at two to three atmospheres of hydrogen using platinum oxide as catalyst and glacial acetic acid as solvent. A Parr Hydrogenation Apparatus is suitable for these reactions. This reaction produces a cis/trans isomer mixture of about 2 or 3/1. The cis and trans designation refers to the relationship of the 4-alkyl substituent and carboxylic acid group on the cyclohexane ring, this is illustrated below

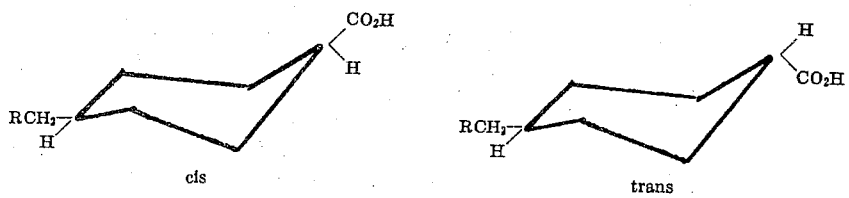

The Schmidt reaction (VI) is performed by dissolving the cyclohexane carboxylic acid derivative in a mixture of chloroform and concentrated sulfuric acid. Sodium azide is then added in small portions to the stirring mixture at a rate sufficient to keep the reaction temperature between 35° and 45°C. The mixture is stirred at about 45° to 50°C. until the bubbling nearly stops (one to three hours). The mixture is then transferred to a separatory funnel, and the lower, gelatinous sulfuric acid, layer is slowly dripped onto ice. The amine sulfate precipitates as a soapy material which slowly crystallizes. The chloroform should be kept away from the ice water mixture since it makes the work-up much more difficult. Those amines which crystallize as the hemisulfates or sulfates are filtered and washed with water. It is convenient to store these amines as their salts. Those amine salts which fail to crystallize are converted to the free bases by making the sulfuric acid solution alkaline, and extracting the amine with dichloromethane. The amine is then purified by distillation. The Schmidt reaction proceeds without changing the cis/trans product ratio.

The hydrogenation (VII) can be performed on a Parr Hydrogenation Apparatus using platinum oxide as catalyst and glacial acetic acid as solvent. The cis trans ratio of the cyclohexylamine product is about 1:1.

The reaction in step VIII is performed by the addition of the desired amine to a benzene solution containing a stoichiometric amount of the β-chloroethylisocyanate. The reactants are refluxed for several hours to insure completion of the reaction. The benzene is removed in vacuum leaving a residue which can be crystalline but is often gummy. The residue is boiled in water for several hours and the 2-oxazoline forms as shown in step IX. The milky suspension is filtered, and the oxazoline is present in the filtrate as the water soluble hydrochloride salt. Aqueous sodium hydroxide solution is added to this solution of the salt according to step X and the free oxazoline derivative precipitates.

Since cis/trans mixtures of amines are used, the resulting oxazoline derivatives are also cis/trans mixtures. The cis:trans ratio ranges from 1:1 to 3:1 depending on the method of synthesis of the amines. The irritant oxazolines can be used without separation of the isomers.

Compositions

Compounds of this invention can be administered alone, but are generally contained in a composition with an inert diluent non-toxic to animals. The diluent selected depends on the route of administration.

Emulsifying agents can be used with the diluent and compound of formula (1) to aid in dispersion of the active ingredient. Emulsifying agents that could be used include alkylaryl polyethoxy alcohols, alkyl and alkylaryl polyether alcohols, polyoxyethylene sorbitol or sorbitan fatty esters, polyethylene glycol fatty esters, fatty alkylol amide condensates, amine salts of fatty alcohol sulfates plus long chain alcohols and oil soluble petroleum sulfonates.

The amount of emulsifying agent in the composition will range from 0.1 to 20 percent by weight.

Since the compounds of the present invention would generally be administered by vapor or spray application, the compositions will contain a liquid diluent such as water, acetone, hexane, gasoline, kerosene, other hydrocarbon oils, alcohols or other liquids generally used in pharmaceutical preparations. When aqueous solutions are used, oxazoline salts, such as the hydrochloride salt, can be used in place of the free base.

The amount of active ingredient in the composition will vary from 0.005 percent by weight to 95 percent or even higher. The diluent will generally constitute the major proportion of the composition and the amount of active ingredient will be less than 50 percent by weight. The exact concentration of the active ingredient will depend on the mechanism used for administration and will be easily understood by one knowledgeable in pharmaceutical application rates.

Application

A quantity of active ingredient sufficient to cause irritation to animal tissue is 20 to 5000 micrograms per liter of air at exposure of one minute. Rates of over 6000 micrograms per liter of air at exposure of one minute kills 50 percent of the mice which are treated.

The following additional examples are provided to more clearly illustrate the invention.

EXAMPLE 1

A 19.5 gram (0.1 mole) sample of 4-cyclohexylmethylcyclohexylamine (cis/trans mixture) is added to 10.5 grams (0.1 mole) of β-chloroethylisocyanate in 100 milliliters of benzene. The solution is refluxed for two hours, and then the benzene is removed in vacuum. The gummy residue crystallizes after it is triturated with pentane. The urea is suspended in one liter of boiling water. After having been heated for one hour at 50°–70°C., the cloudy suspension is filtered. The 2-(4-cyclohexylmethylcyclohexylamino)-2-oxazoline hydrochloride is dissolved in the filtrate. The filtrate is made alkaline with dilute, aqueous sodium hydroxide causing the 2-(4-cyclohexylmethylcyclohexylamino)-2-oxazoline to precipitate. After having been filtered and washed with cold pentane, the crystals melt at 93°–95°C. The melting point is raised to 110°–112°C. after the sample is recrystallized from acetonitrile.

Calc'd. for $C_{16}H_{28}N_2O$: C, 72.7; H, 10.7; N, 10.6 percent.

Found: C, 72.3; H, 10.6; N, 10.4 percent.

Mice are treated by aerosol exposure to the cis/trans mixture of 2-(4-cyclohexylmethylcyclohexylamino)-2-oxazoline in the following manner: The compound is administered as an aerosol into a 2.8 liter chamber. The exposure chamber consists of a 2.8 liter bell jar over a nebullizer inserted through the floor of the chamber. Mice are exposed for five minutes to 200.0 micrograms per liter (1,000 Ct). The compound is dissolved in 1.4 ml. of acetone and during a span of 20 seconds the compound is sprayed up into the chamber. No further air is transferred into or out of the chamber during the five minute exposure.

After this exposure, irritant activity is observed in all mice exposed, but not in controls exposed to 1.4 ml. of acetone alone. Irritant activity can be described as the presence of one or more of the following reactive signs:

a. abnormal gait, including rubbing of the nose on the floor while running about
b. blinking
c. depression
d. dyspnea
e. muscle weakness.

EXAMPLES 2 – 21

The following compounds are made in the manner of the 2-(4-cyclohexylmethycyclohexylamino)-2-oxazoline of Example 1 by substituting like molar amounts of the appropriate amines. The compounds are formulated and applied in like manner to provide like results.

2. 2-(4-n-Butylcyclohexylamino)-2-oxazoline.
3. 2-(4-Cyclobutylmethylcyclohexylamino)-2-oxazoline
4. 2-(4-Cyclopentylmethylcyclohexylamino)-2-oxazoline.
5. 2-(4-n-Hexylcyclohexylamino)-2-oxazoline.
6. 2-(4-n-Heptylcyclohexylamino)-2-oxazoline.
7. 2-(4-iso-Butylcyclohexylamino)-2-oxazoline.
8. 2-(4-Cycloheptylmethylcyclohexylamino)-2-oxazoline.
9. 2-(4-Cyclooctylmethylcyclohexylamino)-2-oxazoline.
10. 2-(4-Cyclononylmethylcyclohexylamino)-2-oxazoline.
11. 2-(4-n-Octylcyclohexylamino)-2-oxazoline.
12. 2-(4-n-Nonylcyclohexylamino)-2-oxazoline.
13. 2-(4-(2-[2.2.1]-bicycloheptylmethyl)cyclohexylamino)-2-oxazoline.
14. 2-(4-(3-Methylpentyl)cyclohexylamino)-2-oxazoline.
15. 2-(4-(2-ethylpentyl)cyclohexylamino)-2-oxazoline.
16. 2-(4-(3,3,5-Trimethylheptyl)cyclohexylamino)-2-oxazoline.
17. 2-(4-n-Pentylcyclohexylamino)-2-oxazoline.
18. 2-[4-(1-adamantylmethyl)cyclohexylamino]-2-oxazoline.

19. 2-[4-(1-homoadamantylmethyl)cyclohexylamino]-2-oxazoline.
20. 2-[4-(3-Cyclopentylpropyl)cyclohexylamino]-2-oxazoline.
21. 2-[4-(2-[3.3.1]-bicyclononylmethyl)cyclohexylamino]-2-oxazoline.

EXAMPLE 22

Dogs are exposed to 2-(4-cyclohexylmethylcyclohexyl)-2-oxazoline in acetone spotted on a 6 cm. circle of filter paper. The dog's head is held by an operator, and the dried paper is held 6 to 12 cm. from the muzzle. Within 10–30 seconds the dog salivates, licks his lips, and occasionally face-paws. Generally he struggles to escape further irritant effects. As little as 10 milligrams on paper is sufficient to cause visible discomfort in most dogs.

EXAMPLE 23

A test chamber comprising a plastic rectangular box of 65 liters, is filled with an aerosol spray of 2-(4-cyclohexylmethylcyclohexylamino)-2-oxazoline. The spray is administered 2 cm. above an immobilized rabbit, and 3 cm. distant from the end of the nose The aerosol is aimed directly at the rabbit. Administration of compound takes approximately one minute. At 5,000 Ct (five minutes), the rabbit exhibited lacrimation, nasal exudate, face pawing and constant head shaking. After several minutes the eyes became static after periods of blinking. Dyspnea continued for two hours after exposure.

In Examples 1 – 21 the cis isomer can be made by separating the cis/trans isomers employing chromatography over silicic acid using chloroform as eluant. The ratio of silicic acid to cis:trans compound is 50:1.

I claim:

1. Method of repelling animals comprising applying to an area to be protected from animals in an amount sufficient to cause irritation to animal tissue, a compound of the formula:

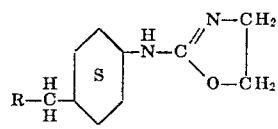

wherein
R is selected from the group consisting of alkyl of three through eight carbon atoms, cycloalkyl of four through nine carbon atoms, cycloalkylalkyl of five through 10 carbon atoms, bicycloalkyl of seven through 10 carbon atoms, and tricycloalkyl of 10 through 11 carbon atoms.

2. Method of repelling animals according to claim 1 wherein R is alkyl of three through eight carbon atoms in the compound applied.

3. Method of repelling animals according to claim 1 wherein R is cycloalkyl of four through nine carbon atoms in the compound applied.

4. Method of repelling animals according to claim 1 wherein R is cycloalkylalkyl of five through 10 carbon atoms in the compound applied.

5. Method of repelling animals according to claim 1 wherein R is bicycloalkyl of seven through 10 carbon atoms in the compound applied.

6. Method of repelling animals according to claim 1 wherein R is tricycloalkyl of 10 through 11 carbon atoms in the compound applied.

7. Method of repelling animals comprising applying to an area to be protected from animals in an amount sufficient to cause irritation to animal tissue, 2-(cis-4-cyclohexylmethylcyclohexylamino)-2-oxazoline.

8. Method of repelling animals comprising applying to an area to be protected from animals in an amount sufficient to cause irritation to animal tissue, 2-(4-n-butylcyclohexylamino)-2-oxazoline.

9. An animal irritant composition comprising a major amount of an inert liquid diluent non-toxic to animals and an amount sufficient to cause irritation to animal tissue of a compound of the formula:

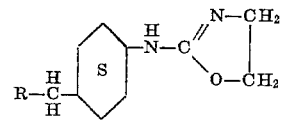

wherein
R is selected from the group consisting of alkyl of three through eight carbon atoms, cycloalkyl of four through nine carbon atoms, cyclo-alkylalkyl of five through 10 carbon atoms, bicycloalkyl of seven through 10 carbon atoms, and tricycloalkyl of 10 through 11 carbon atoms.

* * * * *